(12) United States Patent
Cho

(10) Patent No.: US 10,589,744 B2
(45) Date of Patent: Mar. 17, 2020

(54) SHIFTING CONTROL METHOD FOR VEHICLE WITH DUAL CLUTCH TRANSMISSION

(71) Applicants: Hyundai Motor Company, Seoul (KR); Kia Motors Corp., Seoul (KR)

(72) Inventor: Sung Hyun Cho, Yongin-si (KR)

(73) Assignees: Hyundai Motor Compnay, Seoul (KR); Kia Motors Corp., Seoul (KR)

( * ) Notice: Subject to any disclaimer, the term of this patent is extended or adjusted under 35 U.S.C. 154(b) by 153 days.

(21) Appl. No.: 16/009,563

(22) Filed: Jun. 15, 2018

(65) Prior Publication Data
US 2019/0248371 A1    Aug. 15, 2019

(30) Foreign Application Priority Data

Feb. 13, 2018  (KR) .................. 10-2018-0017431

(51) Int. Cl.
*B60W 30/18* (2012.01)
*B60W 10/02* (2006.01)
(Continued)

(52) U.S. Cl.
CPC ...... *B60W 30/18136* (2013.01); *B60W 10/02* (2013.01); *B60W 10/06* (2013.01); *B60W 10/113* (2013.01); *B60W 30/19* (2013.01); B60W 2510/0241 (2013.01); B60W 2510/0657 (2013.01); B60W 2510/0695 (2013.01);
(Continued)

(58) Field of Classification Search
CPC ........... B60W 30/18; B60W 30/18136; B60W 30/19; B60W 10/02; B60W 10/06; B60W 10/113; B60W 2510/0241; B60W 2510/0657; B60W 2510/0695; B60W 2510/1015; B60W 2710/021;
(Continued)

(56) References Cited

U.S. PATENT DOCUMENTS

2011/0306464 A1* 12/2011 Holland ................ B60W 10/02
                                                                477/77
2014/0121874 A1*  5/2014 Kim .................... B60W 10/113
                                                                701/22
(Continued)

FOREIGN PATENT DOCUMENTS

JP         5999056 B2    9/2016
JP         6089937 B2    3/2017
(Continued)

*Primary Examiner* — Huan Le
(74) *Attorney, Agent, or Firm* — Morgan, Lewis & Bockius LLP

(57) ABSTRACT

A shifting control method for a vehicle with a dual clutch transmission (DCT), the shifting control method may include controlling engine torque to be increased according to reserve demand torque by giving the reserve demand torque of an engine to be increased to a predetermined value or more when if a controller determines that the vehicle enters a manual power off and downshift shifting; controlling, by the controller, a release side clutch to be released; controlling, by the controller, an engine torque to perform a control so that engine speed follows coupling side input shaft speed; and completing the shifting by performing a control so that a coupling side clutch is coupled when it is determined that the actual shift is completed.

7 Claims, 3 Drawing Sheets

(51) Int. Cl.
 *B60W 10/06* (2006.01)
 *B60W 10/113* (2012.01)
 *B60W 30/19* (2012.01)
(52) U.S. Cl.
 CPC ............... *B60W 2510/1015* (2013.01); *B60W 2710/021* (2013.01); *B60W 2710/0644* (2013.01); *B60W 2710/0666* (2013.01); *B60W 2710/1005* (2013.01)
(58) Field of Classification Search
 CPC . B60W 2710/0644; B60W 2710/0666; B60W 2710/1005
 See application file for complete search history.

(56) References Cited

U.S. PATENT DOCUMENTS

2015/0166040 A1* 6/2015 Cho ..................... F16H 61/061
 701/53
2017/0096069 A1* 4/2017 Cho ......................... B60L 7/18

FOREIGN PATENT DOCUMENTS

| KR | 10-1339212 B1 | 12/2013 |
| WO | WO 96/35874 A1 | 11/1996 |

* cited by examiner

SHIFTING CONTROL METHOD FOR VEHICLE WITH DUAL CLUTCH TRANSMISSION

CROSS REFERENCE TO RELATED APPLICATION

The present application claims priority to Korean Patent Application No. 10-2018-0017431, filed Feb. 13, 2018, the entire contents of which is incorporated herein for all purposes by this reference.

BACKGROUND OF THE INVENTION

Field of the Invention

The present invention relates to a shifting control method for a vehicle with dual clutch transmission configured for implementing rapid shifting performance by rapidly responding an engine torque rise request required by a transmission in a power off and downshift driving situation.

Description of Related Art

In an automatic transmission vehicle, a manual shifting, which is used by operating a shifting lever when a driver wants to directly operate a shifting pattern, may make the driver feel sporty driving and may be used when the driver feels that deceleration is necessary, such as a downhill driving situation of the vehicle.

When an engine brake is required according to a manual power off and downshift shifting due a (−) TIP operation by the driver, an APS signal is 0% and the vehicle is thus in a state such as fuel cut.

However, to perform the downshift shifting to a lower stage, since a real shifting process of synchronizing engine speed with coupling side input shaft speed is required, a control to increase the engine speed is required. Therefore, an engine performs the control to increase the engine speed by controlling an air amount and an ignition angle from a moment at which the torque required from the transmission is requested.

However, when the APS signal is in an on state, the engine outputs a certain amount of power. Therefore, the engine may rapidly respond to the torque request required by the transmission. However, when the APS signal is 0% such as the power off and downshift, the engine controls only the minimum torque. As a result, there is a problem that a time delay occurs in a response to an excessive torque rise request of the transmission, causing a reduction in a shifting speed.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a shifting control method for a vehicle with dual clutch transmission (DCT) configured for implementing rapid shifting performance by rapidly responding an engine torque rise request required by a transmission in a power off and downshift driving situation.

According to an exemplary embodiment of the present invention, a shifting control method for a vehicle with a dual clutch transmission (DCT) includes an initial shift step of controlling engine torque to be increased according to reserve demand a torque by giving the reserve demand a torque of an engine to be increased to a predetermined value or more when if a controller is configured to determine that the vehicle enters a manual power off and downshift shifting; a clutch release step of controlling, by the controller, a release side clutch to be released; an actual shift step of controlling, by the controller, an engine torque to perform a control so that engine speed follows coupling side input shaft speed; and a shift completion step of completing the shifting by performing a control so that a coupling side clutch is coupled when it is determined that the actual shift is completed.

In the initial shift step, the reserve demand torque may be set to be in proportion to an amount of slip of the coupling side clutch.

In the clutch release step, cooperative control demand torque may be controlled to 0 Nm.

The actual shift step may include a demand torque determination step of determining reserve demand torque and cooperative control demand torque of an engine by feeding back a difference between a differential value of a target amount of slip and a differential value of a current amount of slip of the coupling side clutch to a value obtained by multiplying engine inertia and a differential value of an amount of slip of the coupling side clutch; and an engine torque control step of controlling the engine torque based on the reserve demand torque or the cooperative control demand torque.

The engine torque control step may include a step of controlling the engine torque according to the reserve demand torque; and a step of controlling the engine torque according to the cooperative control demand torque while releasing the reserve demand torque when the engine torque reaches the cooperative control demand torque.

In the shift completion step, when a current amount of slip of the coupling side clutch is an amount of synchronization reference slip or less and a target stage gear is coupled, the coupling side clutch may be coupled by increasing the coupling side clutch torque to an absolute value or more of cooperative control demand torque.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
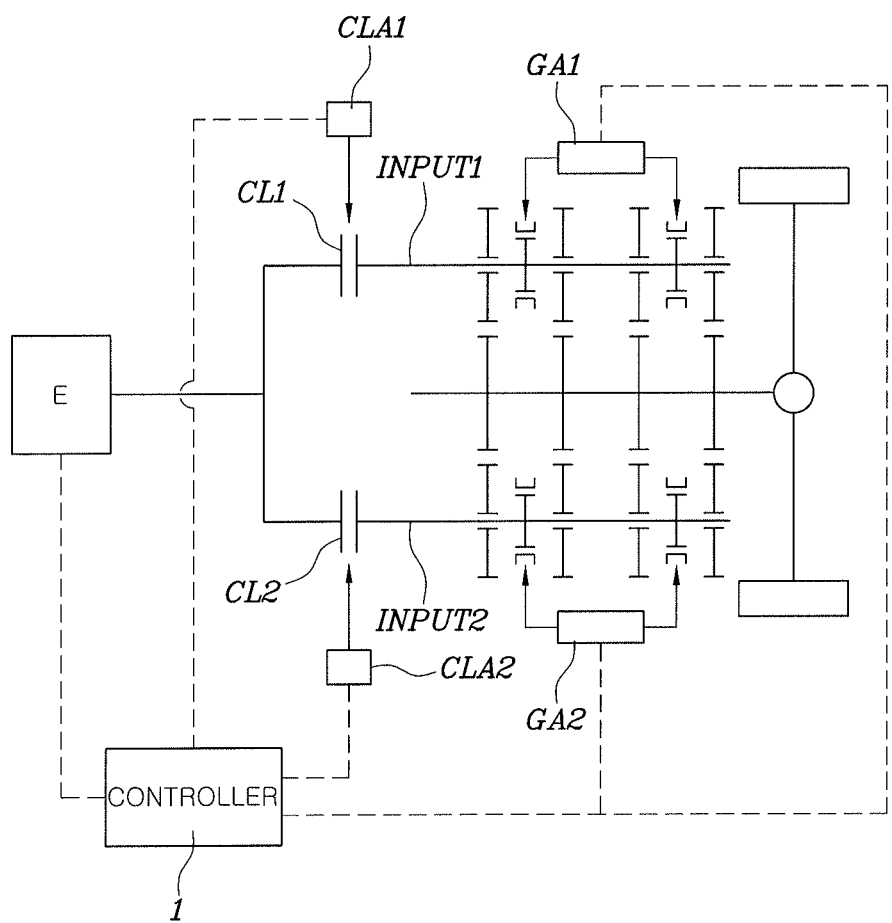
FIG. 1 is a view illustrating a configuration of a power train of a vehicle in which a dual clutch transmission (DCT) applicable to an exemplary embodiment of the present invention is mounted.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

FIG. 1 is a view illustrating a configuration of a power train of a vehicle in which a dual clutch transmission (DCT) applicable to the present invention is mounted. The respective components illustrated in FIG. 1 will be described briefly. A coupling side clutch and a release side clutch, which are two clutches included in the DCT, are denoted as reference numerals of CL1 and CL2, respectively, a coupling side clutch actuator and a release side clutch actuator that operate the CL1 and CL2 are denoted as reference numerals as CLA1 and CLA2, and a coupling side input shaft and a release side input shaft are denoted as reference numerals of INPUT1 and INPUT2, respectively. Furthermore, reference numerals of GA1 and GA2 denote coupling side and release side gear actuators, and reference numeral of E denotes an engine.

However, these reference numerals are merely for convenience of understanding for an exemplary embodiment of the present invention, and the coupling side and the release side may be exchanged with each other depending on a current shift stage and a target shift stage.

Meanwhile, a shifting control method for a vehicle with a DCT according to an exemplary embodiment of the present invention may include an initial shift step, a clutch release step, an actual shift step, and a shift completion step.

Figure 2:
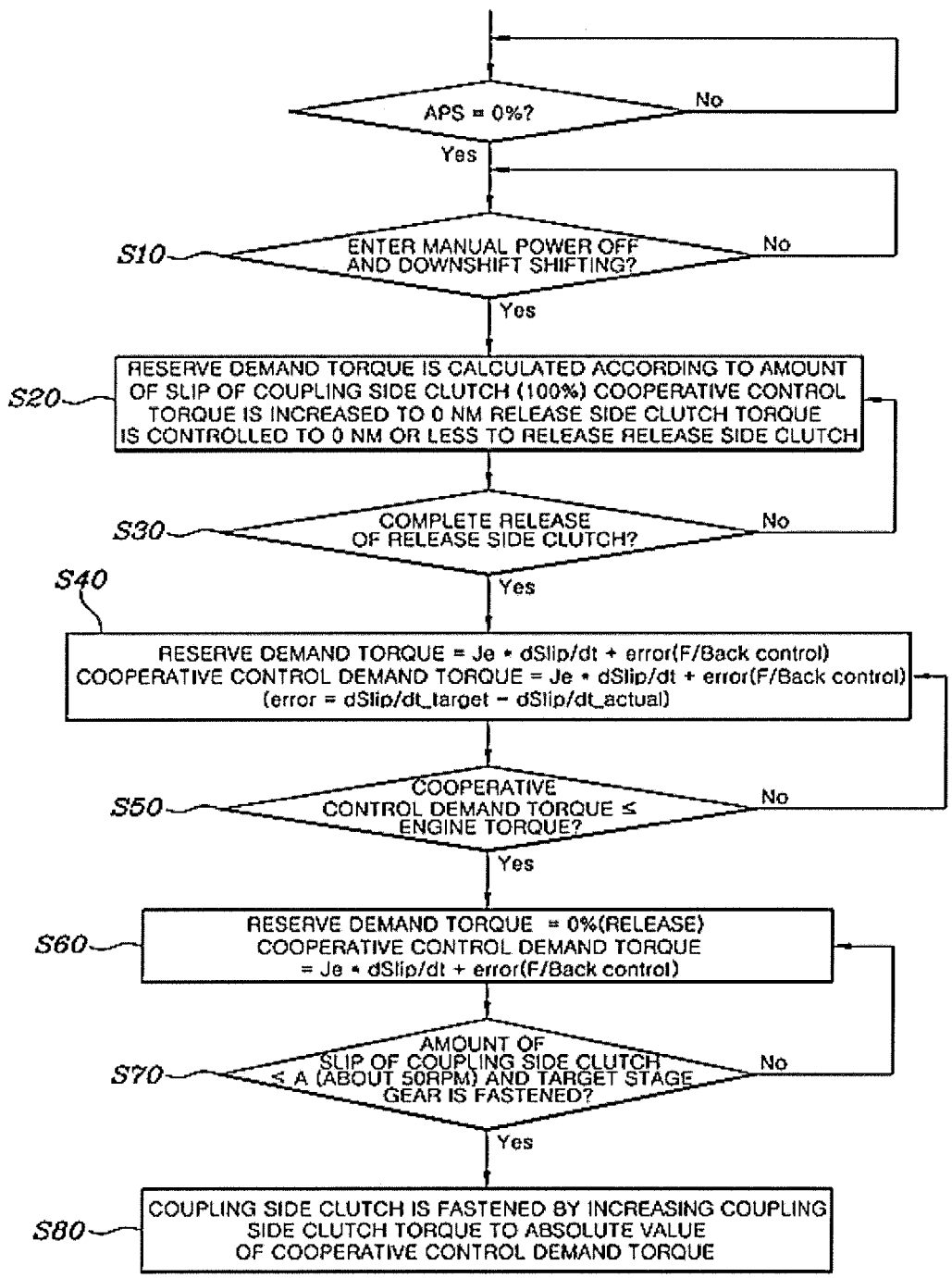
FIG. 2 is a view illustrating a shifting control flow of a vehicle with a dual clutch transmission (DCT) according to an exemplary embodiment of the present invention.
Figure 3:
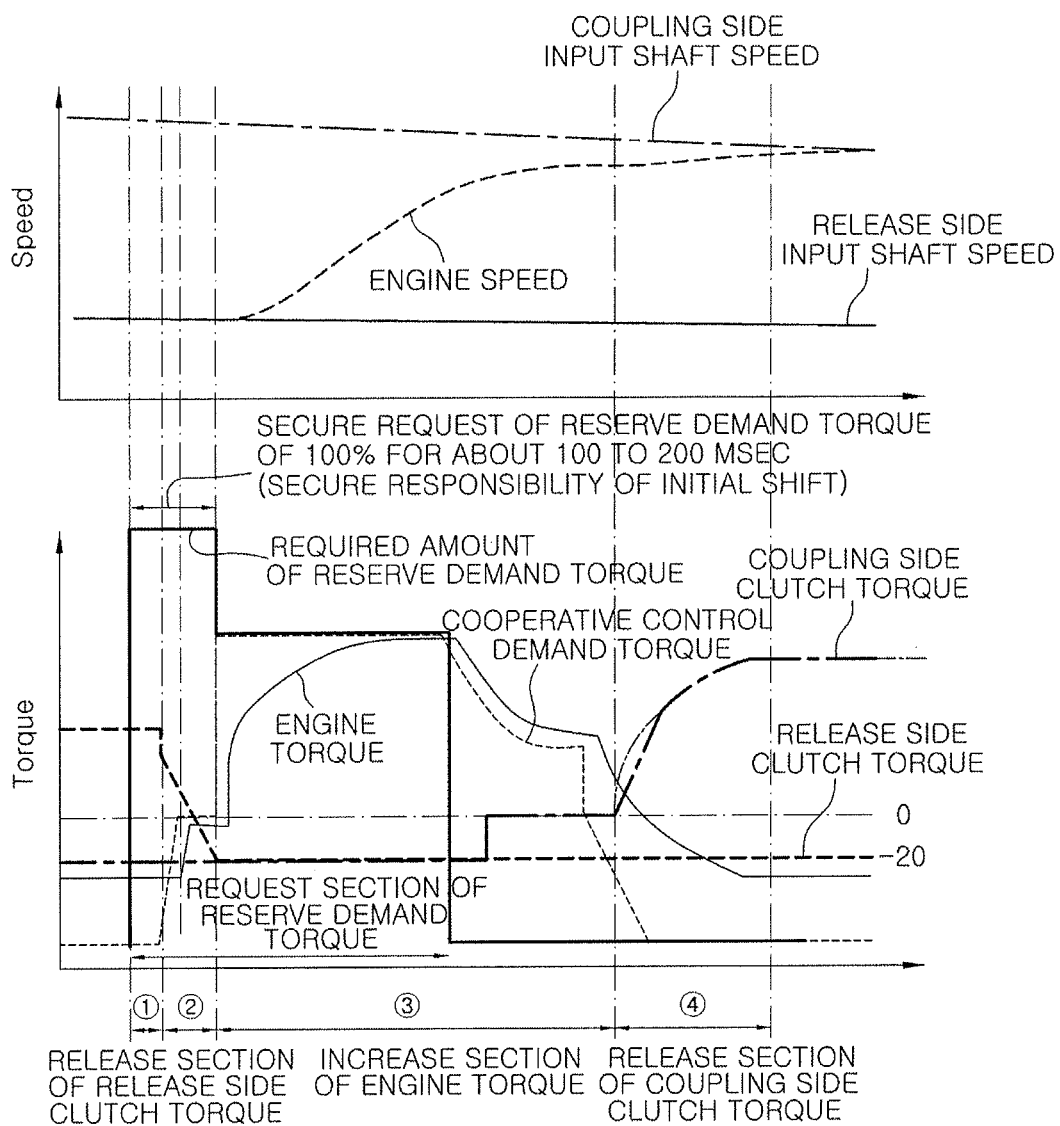
FIG. 3 is a view illustrating an aspect of a change in torque and speed according to an application of a shifting control method according to an exemplary embodiment of the present invention.

The present invention will be described in detail with reference to FIG. 2 and FIG. 3. First, in the initial shift step, if a controller 1 determines that the vehicle enters a manual power off and downshift shifting, the controller 1 may control engine torque to be increased according to reserve demand torque by giving the reserve demand torque of an engine to be increased to a predetermined value or more.

For example, if a shift command to a lower stage is applied by tip-operating a shift lever to a (−) stage of a manual mode according to an intent of a driver in a state in which the driver does not step on an accelerator pedal, it may be determined that a manual power off and downshift shifting condition is satisfied.

Furthermore, the reserve demand torque may be set to be in proportion to an amount of slip of the coupling side clutch. If the coupling side clutch is in a release state, the amount of slip becomes the maximum. As a result, the reserve demand torque may be given at a maximum value.

Next, in the clutch release step, the controller 1 may control the release side clutch to be released.

In the instant case, to improve responsibility of an engine torque control in an actual shift section to be described below, the controller 1 may control cooperative control demand torque of the engine to be increased to 0 Nm.

Furthermore, in the actual shift step, the controller 1 may control engine torque to perform a control so that engine speed follows coupling side input shaft speed.

Next, in the shift completion step, if the controller 1 determines that the actual shift is completed, the controller 1 may complete the shifting by performing a control so that a coupling side clutch is coupled.

That is, according to the configuration described above, when the power off and downshift shifting to the lower stage is performed according to the intent of the driver, the engine torque may be rapidly increased by controlling the reserve demand torque for controlling the engine torque to be rapidly increased at the beginning of the shifting.

Therefore, reactivity of the engine torque is improved such that the engine speed is more rapidly synchronized with the coupling side input shaft speed. As a result, the responsibility of the shifting is improved and sense of the engine brake is increased, improving drivability and marketability of the vehicle.

Furthermore, the actual shift step may include a demand torque determination step of determining reserve demand torque and cooperative control demand torque of an engine by feeding back a difference between a differential value of a target amount of slip and a differential value of a current amount of slip of the coupling side clutch to a value obtained by multiplying engine inertia and a differential value of an amount of slip of the coupling side clutch, and an engine torque control step of controlling the engine torque based on the reserve demand torque or the cooperative control demand torque.

For example, the reserve demand torque may be determined by Equation below.

reserve demand torque=$Je*d$Slip/$dt$+error(Feed back)

error=$d$Slip/$dt$_target−$d$Slip/$dt$_actual

Slip=$V$_app−$V$_eng/$V$_app−$V$_rel

Je: rotational inertia of engine
dSlip/dt_target: differential value of target amount of slip
dSlip/dt_actual: differential value of current amount of slip
V_app: coupling side input shaft speed
V_rel: release side input shaft speed
V_eng: engine speed In the instant case, the cooperative control demand torque after entering the actual shift step is also determined by the Equation above. Since both the reserve demand torque and the cooperative control demand torque are demand torques for controlling the engine torque, the reserve demand torque and the cooperative control demand torque may be determined as the same value.

The engine toque control step will be described in more detail. When entering the actual shift section after the release side clutch is released, a step of controlling the engine torque may be first performed according to the reserve demand torque.

Furthermore, when the engine torque reaches the cooperative control demand torque, a step of controlling the engine torque according to the cooperative control demand torque while releasing the reserve demand torque may be performed.

That is, if the engine torque is controlled to be increased according to the reserve demand torque in the actual shift section and the engine torque is then increased to reach the cooperative control demand torque, the engine torque is controlled by determining only the cooperative control demand torque without determining the reserve demand torque.

Continuously, in the shift completion step, if the current amount of slip of the coupling side clutch is an amount of synchronization reference slip or less and a coupling side gear is coupled, the coupling side clutch may be coupled by increasing the coupling side clutch torque to an absolute value or more of the cooperative control demand torque.

For example, if the engine speed is substantially synchronized with the coupling side input shaft speed by following the coupling side input shaft speed, for the engine brake, the engine torque is decreased to less than 0 Nm and the coupling side clutch torque is controlled to be increased to the absolute value or more of the cooperative control demand torque.

That is, since the cooperative control demand torque is controlled to (−) torque to decrease the engine torque to less than 0 Nm, the coupling side clutch may be coupled by controlling the coupling side clutch torque to be increased by the absolute value or more of the cooperative control demand torque, implementing the engine brake by an engine load.

Hereinafter, an overall shifting control process of a vehicle with a DCT according to an exemplary embodiment of the present invention will be described with reference to FIG. 2 and FIG. 3.

First, if it is determined that the vehicle enters a power off and downshift shifting in a manual mode (S10), reserve demand torque is determined based on an amount of slip of a coupling side clutch (S20).

In the instant case, since the coupling side clutch needs to provide engine power to a target shift stage, it is in a released state. Therefore, the reserve demand torque of 100% is determined for about 100 to 200 msec, and the engine torque is controlled to be increased based on the reserve demand torque.

However, after an actual shift section, the cooperative control demand torque for controlling the engine torque is controlled to be increased to 0 Nm, and the release side clutch is released by controlling the release side clutch torque to 0 Nm or less.

Next, if the release of the release side clutch is completed (S30), the reserve demand torque and the cooperative control demand torque are determined by a feedback control in which an error value, which is a difference between a differential value of a target amount of slip and a differential value of a current amount of slip of the coupling side clutch is added to a value obtained by multiplying engine inertia and a differential value of an amount of slip of the coupling side clutch, and the engine speed is controlled to be converged on the coupling side input shaft speed while being out of the release side input shaft speed by controlling the engine torque to be increased based on the determined reserve demand torque (S40).

In the present process, it is determined whether or not the engine torque reaches the cooperative control demand torque (S50). As a result of the determination, if the engine torque reaches the cooperative control demand torque, the determination of the reserve demand torque is released and the engine torque is controlled based on the cooperative control demand torque, such that the engine speed is converged on the coupling side input shaft speed and the amount of slip of the coupling side clutch is gradually reduced (S60).

Furthermore, it is determined whether or not the amount of slip of the coupling side clutch is A, which is the amount of synchronization reference slip, or less, and the gear for forming the target shift stage is in a coupled state (S70).

As a result of the determination, if the amount of slip and the gear fastening condition are satisfied, the coupling side clutch is coupled by increasing the coupling side clutch torque to the absolute value or more of the cooperative control demand torque, and the shifting is completed (S80).

As described above, according to an exemplary embodiment of the present invention, when the vehicle enters the manual power off and downshift shifting, the engine torque may be rapidly increased by controlling the reserve demand torque for controlling the engine torque to be increased at the beginning of the shifting.

Therefore, the reactivity of the engine torque is improved such that the engine speed is more rapidly synchronized with the coupling side input shaft speed. As a result, the responsibility of the shifting is improved and sense of the engine brake is increased, improving drivability and marketability of the vehicle.

According to the exemplary embodiments of the present invention, the engine torque is controlled to be rapidly increased by controlling the reserve demand torque to be rapidly increased at the beginning of the manual power off and downshift shifting, it is possible to improve responsibility of the shifting by increasing reactivity of the engine torque and to improve drivability and marketability of the vehicle by increasing detect of the engine brake.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting control method for a vehicle with a dual clutch transmission (DCT), the shifting control method comprising:
   an initial shift step of controlling an engine torque to be increased according to a reserve demand torque by giving the reserve demand torque of an engine to be increased to a predetermined value or more when a controller determines that the vehicle enters a manual power off and downshift shifting;
   a clutch release step of controlling, by the controller, a release side clutch to be released;

an actual shift step of controlling, by the controller, the engine torque so that engine speed follows a coupling side input shaft speed; and a shift completion step of completing shifting of the DCT by the controller so that a coupling side clutch is coupled when the controller determines that the shifting is completed.

2. The shifting control method of claim 1, wherein in the initial shift step, the reserve demand torque is set to be in proportion to an amount of slip of the coupling side clutch.

3. The shifting control method of claim 1, wherein in the clutch release step, a cooperative control demand torque is controlled to 0 Nm.

4. The shifting control method of claim 1, wherein the actual shift step includes:

a demand torque determination step of determining the reserve demand torque and a cooperative control demand torque of the engine by feeding back a difference between a differential value of a target amount of slip and a differential value of a current amount of slip of the coupling side clutch to a value obtained by multiplying engine inertia and a differential value of an amount of slip of the coupling side clutch; and an engine torque control step of controlling the engine torque based on the reserve demand torque or the cooperative control demand torque.

5. The shifting control method of claim 4, wherein the engine torque control step includes:

controlling the engine torque according to the reserve demand torque; and controlling the engine torque according to the cooperative control demand torque while releasing the reserve demand torque when the engine torque reaches the cooperative control demand torque.

6. The shifting control method of claim 5, wherein when the engine torque reaches the cooperative control demand torque, the engine torque is controlled based on the cooperative control demand torque, such that the engine speed is converged on the coupling side input shaft speed and the amount of slip of the coupling side clutch is reduced.

7. The shifting control method of claim 1, wherein in the shift completion step, when a current amount of slip of the coupling side clutch is an amount of synchronization reference slip or less and a target stage gear is coupled, the coupling side clutch is coupled by increasing a coupling side clutch torque to an absolute value or more of a cooperative control demand torque.

* * * * *